United States Patent [19]

Gohara et al.

[11] Patent Number: 5,421,861

[45] Date of Patent: Jun. 6, 1995

[54] SCRUBBING METHOD AND APPARATUS INCORPORATING PROGRESSIVELY INCREASED GAS VELOCITY

[75] Inventors: Wadie F. Gohara; Denis W. Johnson, both of Barberton; Thomas W. Strock, Jackson Township, Stark County, all of Ohio

[73] Assignee: The Babcock & Wilcox Company, New Orleans, La.

[21] Appl. No.: 346,802

[22] Filed: Nov. 30, 1994

Related U.S. Application Data

[63] Continuation-in-part of Ser. No. 188,182, Jan. 28, 1994, abandoned.

[51] Int. Cl.⁶ .............................................. B01F 3/04
[52] U.S. Cl. .................................... 95/235; 55/223; 55/233; 55/257.1; 55/259
[58] Field of Search ................. 55/223, 233, 257.1, 55/259; 95/235; 261/114.1

[56] References Cited

U.S. PATENT DOCUMENTS

| 2,070,100 | 2/1937 | Twomey | 261/114.1 |
| 2,201,502 | 5/1940 | Pyle, 3D | 261/113 |
| 3,192,689 | 7/1965 | Smith | 55/259 |
| 3,353,799 | 11/1967 | Lions et al. | 55/233 |
| 3,593,497 | 7/1971 | Grimm et al. | 95/235 |
| 3,856,487 | 12/1974 | Perez | 55/259 |
| 3,885,929 | 5/1975 | Lyon et al. | 55/259 |
| 4,783,958 | 11/1988 | Borja | 55/233 |
| 5,246,471 | 9/1993 | Bhat et al. | 55/223 |

FOREIGN PATENT DOCUMENTS

| 1127067 | 7/1982 | Canada | 55/257.1 |
| 0039867 | 3/1977 | Japan | 55/259 |

Primary Examiner—Tim R. Miles
Attorney, Agent, or Firm—Robert J. Edwards; Michael L. Hoelter

[57] ABSTRACT

An absorber tower that is configured to progressively increase the flow of the flue gas therethrough. This is accomplished by reducing the cross-sectional area of the tower (either continuously or in steps) thereby forcing the gas to increase in velocity as it travels toward the exit conduit.

12 Claims, 2 Drawing Sheets

SCRUBBING METHOD AND APPARATUS INCORPORATING PROGRESSIVELY INCREASED GAS VELOCITY

This is a continuation-in-part of application Ser. No. 08/188,182, filed Jan. 28, 1994, now abandoned.

FIELD OF THE INVENTION

This invention pertains to absorber towers in general and more specifically to flue gas desulfurization absorber towers which are configured to progressively increase the velocity of the flue gas flowing therethrough.

BACKGROUND OF THE INVENTION

In typical flue gas desulfurization absorber towers, the tower configuration is columnar thereby resulting in a constant gas flow velocity therethrough. In general, the flue gas velocity only changes at the entrance to and the exit from the tower since such entrances and exits are typically much smaller in cross-section than the cross-section of the tower. Thus, through the reactive areas of the tower, the flue gas velocity remains constant, this velocity value being determined by the cross-section of the tower and the volume of the flue gas flowing therethrough (the design or selection of the cross-section or area of the tower, whether for circular or non-circular geometries being a function of the preferred rate of removal and the desired gas residence time).

However, recent studies have shown that the behavior of the slurry droplets sprayed within an absorber tower will vary depending on the flue gas velocity within the tower. Thus, their behavior will not be the same for all flue gas velocity values. For example, at a droplet mean diameter of from 1000 to 5000 microns and at a flow velocity of about 4-7 feet per second (FPS), the measured spray pressure drop within the tower is less than the pressure drop calculated from the spray nozzle momentum equation. At about 10 FPS, the difference between the measured pressure drop and the calculated pressure drop (this difference being termed "recovery") is virtually zero. Such low levels of recovery permit the droplets to fall under their own weight with the gas droplet contact time being controlled by the relative velocity of the droplet. However, above 10 FPS and dependent on droplet mean size, the measured pressure drop is greater than the calculated pressure drop (a positive recovery value) thereby resulting in the suspension of the droplets in the gas stream as indicated by the greater pressure differential across the spray zone. This suspension increases the contact time between the gas and the droplets.

Furthermore, at this greater flow rate (i.e. about 10 FPS and above), it was also observed that the spray around the spray header/nozzles was thicker or more dense than would normally occur around these headers at lower gas velocities dependent on the droplet mean diameter. In other words, a dense fog of spray droplets became suspended in and about the spray zone.

In addition to the above, data also shows that the removal efficiency of $SO_2$ decreases progressively as the flue gas velocity within the tower increases. At about 4-10 FPS, the rate of loss in removal efficiency is fairly slow when compared to the rate of loss at velocities greater that about 10 FPS. However, operating at the preferred lower velocities for greater $SO_2$ removal requires a larger volume absorber tower that will occupy more space at the plant or facility. Thus, operating an absorber tower at about 10 FPS has been deemed to be the most economic velocity from both a capital and operating cost viewpoint and from a $SO_2$ removal viewpoint.

In absorber towers without a tray or other internal devices therein such as packing or another gas distribution device, any increase in flue gas velocity therethrough so as to accommodate an increase in flue gas volume will naturally result in an increase in system resistance along with a decrease in removal efficiency. In an effort to recoup this lost $SO_2$ removal efficiency, the operators of the tower will generally either use additives, increase the amount of reagent or otherwise change the chemistry within the tower, or they may increase the liquid/gas ratio within the tower. These steps all result in higher pump power requirements and an increase in the pressure drop across the tower which, in turn, results in an increase in fan power.

In absorber towers having a tray therein, the use of the tray alone is known to have an advantage of from 20 to 35 units with respect to the liquid/gas ratio over spray towers without such a tray. Additionally, a tray tower (or a packed tower) creates a high efficiency removal region in which significant $SO_2$ removal is achieved. Unfortunately, these tray tower designs incorporate additional system resistance due primarily to the tray itself. Such tray resistance generally comprises two separate elements, the first being the dry tray resistance which is due to the restriction in the flow area. This dry tray resistance does not contribute to the removal efficiency of the pollutants. The second component of tray resistance is the wet tray resistance which is due to the contact between the gas and the liquid layer, including the forth, upon the tray. Such wet tray resistance causes a pressure drop that does contribute to $SO_2$ removal. Ideally, it would be preferable to increase the wet pressure drop without corresponding and substantial increases in the dry component of the tray resistance.

Consequently, as the flue gas velocity through the tower increases so as to accommodate an increase in flue gas volume, the considerable dry tray pressure drop across the tower also increases without any corresponding increase in $SO_2$ removal efficiency. This increase in flue gas velocity in the tray tower generally results in higher system resistance that would not normally be found in an open spray tower or one without a tray. In order to regain such lost efficiency, the operators are oftentimes forced to also use additives or increase the liquid/gas ratio thereby also resulting in higher pump power requirements in addition to an increase in fan power needs.

It is thus an object of this invention to utilize such knowledge and configure an absorber tower that more closely conforms to the requirements needed to remove pollutants from a particular flue gas. One object of this invention is to use low gas velocities for the promotion of high removal rates in one region of the tower and to use higher flue gas velocities elsewhere within the tower where such higher velocities can be tolerated. Another object of this invention is to configure an absorber tower having the required amount of residence time at the desired velocity and then to progressively increase this flue gas velocity so as to both enhance $SO_2$ removal and to boost or increase the passage of the flue gas through the tower thereby making the tower more efficient. Yet another object of this invention is to configure an absorber tower having a first flue gas velocity in the inlet zone and a second flue gas velocity at the spray zone. Still another object of this invention is to configure an absorber tower with yet a third flue gas velocity at the mist eliminators zone and possibly a fourth flue gas velocity at the exit from the tower. These and other objects and advantages of this invention will become obvious upon further investigation.

SUMMARY OF THE INVENTION

This invention pertains to an absorber tower that is configured as an elongated housing (which may be circular or otherwise) that encloses a flue gas inlet zone, a flue gas spray zone and a mist eliminator zone. These three zones are located in that order along the length (height) of the housing through which a flue gas flows. The improvement pertains to first reduction means for reducing the cross-sectional area of the spray zone to a value less than the cross-sectional area of the inlet zone and second means for configuring the cross-sectional area of the mist eliminator zone equal to or less than the cross-sectional area of the spray zone thereby progressively increasing the flue gas velocity through each of these zones and hence the tower.

DETAILED DESCRIPTION OF THE DRAWINGS

Figure 1:
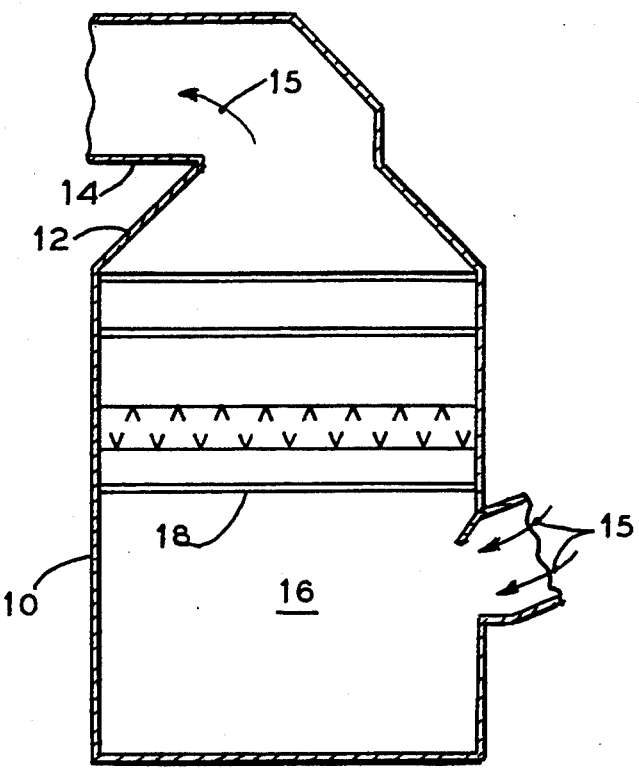
FIG. 1 is a pictorial sectional view of a typical absorber tower known in the art illustrating its columnar design.

Referring initially to FIG. 1, there is shown a sectional view of a traditional flue gas desulfurization absorber tower 10. As illustrated, tower 10 is columnar in shape with a conical exit end region 12 just prior to exit conduit 14. Due to the constant cross-sectional area of tower 10, the velocity of incoming flue gas 15 will generally not vary through reaction zone 16 of tower 10. Tower 10 also illustrates tray 18, but this is optional or tray 18 could be replaced by internal devices for gas/liquid contact such as packing or other gas distribution devices.

Figure 2:
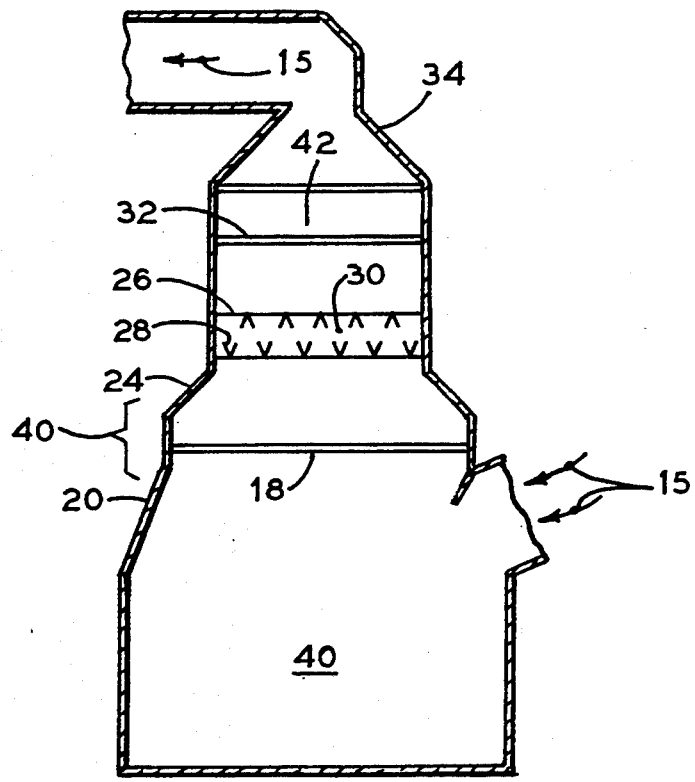
FIG. 2 is a pictorial sectional view of a first embodiment of the invention illustrating a "stepped" design.
Figure 3:
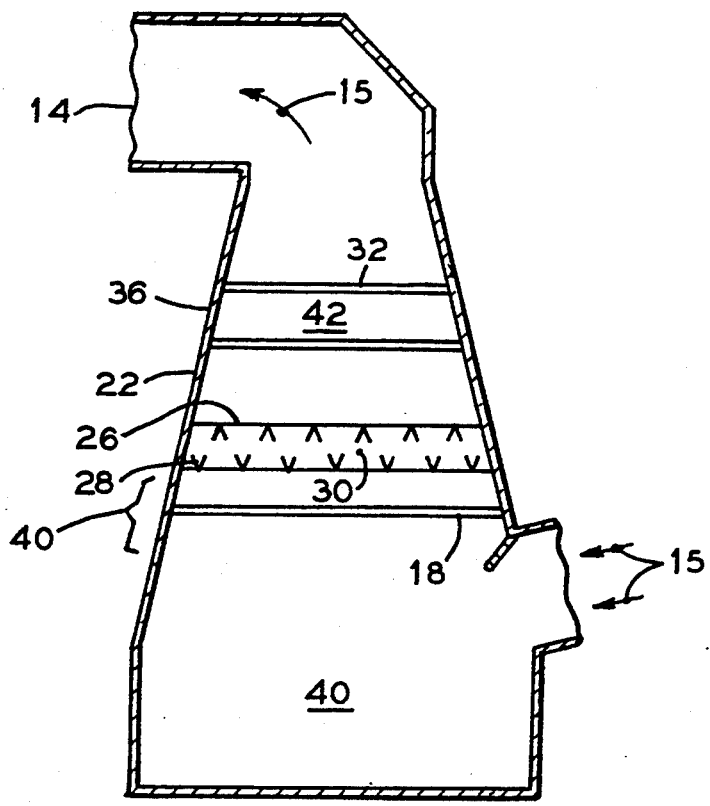
FIG. 3 is a pictorial sectional view of a second embodiment of the invention illustrating a "conical" design.
Figure 4:
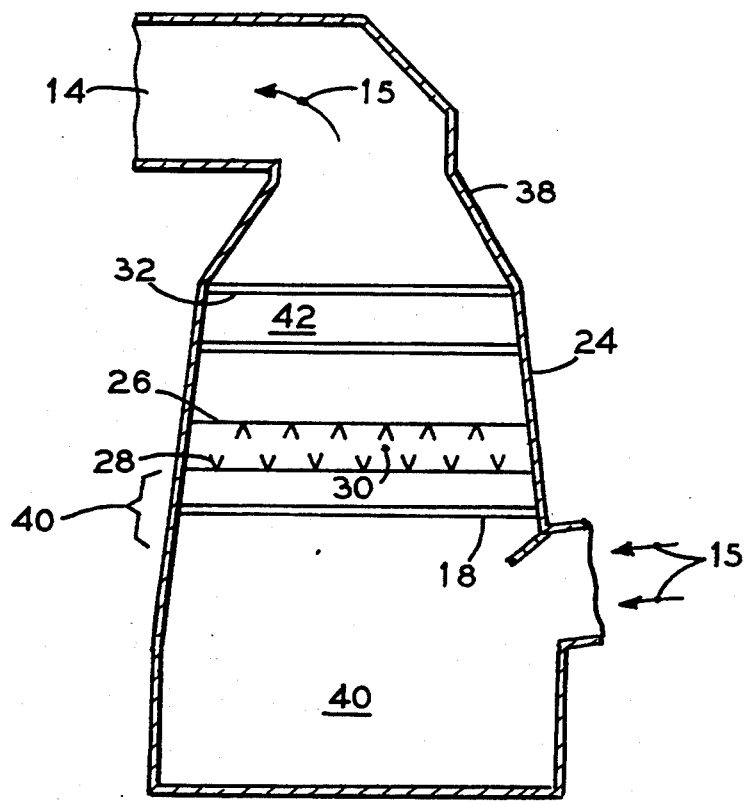
FIG. 4 is a pictorial sectional view of a third embodiment of the invention illustrating a "stepped conical" design.

Referring now to FIGS. 2-4, there are shown new configurations of absorber tower 20. In FIG. 2, this new configuration is deemed to be a "stepped" design. FIG. 3 illustrates a "conical" design while FIG. 4 illustrates a combination of the two or a "stepped conical" design. As can be seen, the cross-sectional area (or diameter) of absorber tower 20 decreases along its height (length) in the direction of flue gas flow 15. This reduction in cross-sectional area along tower 10 causes corresponding increases in the velocity of flue gas 15 as this flue gas travels toward exit conduit 14. Such reductions in cross-sectional area (or circumference for non-circular towers 20) can be made gradually and continuously such as in the shape of a cone 22 (FIGS. 3 and 4) or they can be staggered and made in steps or stages 24 (FIG. 2).

Regardless of the design selected (or another design not shown may be utilized), the ultimate size of each tower 20 is determined by the desired residence time and/or the desired flue gas velocity through tower 20. At low velocities (i.e. about 4–10 FPS), maximum $SO_2$ removal efficiency is obtained from optional tray or packing 18. Above tray or packing 18, the cross-sectional area of tower 20 is reduced so as to cause a corresponding increase in flue gas velocity. Generally, this cross-sectional area above tray 18 is reduced sufficiently enough to achieve a flue gas velocity of about 7–12 FPS, more or less (and upwards of 20 FPS for the design illustrated in FIG. 2). Of course, other values may actually be obtained or utilized depending on the load upon tower 10. Additionally, these values are selected for descriptive purposes only and also to show their relative relationships.

As stated earlier, at a flue gas velocity of about 10 FPS, more or less, it was observed that the spray around headers 26 from nozzles 28 was more dense than would normally occur at lower gas velocities. Thus, at this higher velocity, a dense fog of spray droplets is created which will remain suspended in spray zone 30 that surrounds headers 26 and nozzles 28 for a longer time. Such greater concentration of spray droplets in spray zone 30 results in an increase in the contact time between the droplets and flue gas 15 thereby also increasing reagent utilization in each pass.

Above spray zone 30, the cross-sectional area of tower 20 can remain the same for a flue gas velocity of about 11–20 FPS, more or less, therethrough (FIG. 2). Alternatively, the cross-sectional area above spray zone 30 can be further reduced so as to achieve a flue gas velocity of about 11–20 FPS, more or less, therethrough (FIGS. 3 and 4). Thus, flue gas 15 can optionally pass through mist eliminators 32 at the same velocity as it passes through spray zone 30 (FIG. 2) or flue gas 15 can pass through mist eliminators 32 at a higher flow velocity (FIGS. 3 and 4) than it passes through spray zone 30.

Above mist eliminators 32, the diameter of tower 20 can once again be reduced 34 (FIG. 2) so as to permit the discharge of flue gas 15 through exit conduit 14 or, as shown in FIG. 3, the reduction in diameter of tower 20 can be relatively consistent due to tapering sidewalls 36 of cone 22. In FIG. 4, the region above mist eliminators 32 is stepped 38 so as to facilitate the discharge of flue gas 15 into exit conduit 14.

Thus, there can be two, three, or more separate and distinct zones within tower 20 with each such zone having its own flue gas velocity value. In this embodiment, the region of tower 20 surrounding tray 18 would generally be deemed tray zone 40 and would have a flue gas velocity of about 4–10 FPS, more or less, so as to achieve maximum $SO_2$ removal with minimum penalty on non-productive pressure drop. For the design of FIGS. 3 and 4, spray zone 30, above tray 18 and tray zone 40, would have a corresponding flue gas velocity of about 7–12 FPS, more or less. For the design of FIG. 2, the flue gas velocity corresponding to spray zone 30 would be about 7–20 FPS, more or less. In any event, the increase in flue gas velocity in spray zone 30 over that associated with tray zone 40 encourages the formation of a dense fog within spray zone 30 for maximum liquid/gas droplet contact. Finally, mist eliminator zone 42 of FIGS. 3 and 4 would be associated with a flue gas velocity of about 11–20 FPS, more or less, so as to coincide with the discharge of this flue gas into exit conduit 14. Of course, mist eliminator zone 42 of FIG.

2 would be associated with the same flue gas velocity as that passing through spray zone 30, i.e. 7-20 FPS, more or less.

In this embodiment, spray headers 26 can be single spray headers or they may consist of interspacial headers. Also, it is preferable for at least one header 26 to be in spray zone 30 where the flue gas flow is about 10 FPS, more or less, at design gas flow conditions although generally more than one such header 26 will be so located.

In the event a heavy spray pattern or a greater than normal spray coverage is required upon tray 18, a low liquid/gas ratio header can be placed above tray 18 intermediate tray zone 40 and spray zone 30 so as to maintain adequate coverage of tray 18. In order to maximize the suspension time of the spray of this lower spray header (or another spray header above tray 18), its nozzles 28 can be directed to spray upward. This upward spraying is also desired in order to reduce the gas resistance or the pressure drop across tower 20 and improve droplet suspension. Furthermore, in an effort to contain or prevent the liquid spray from reaching mist eliminator zone 42, nozzles 28 of upper or top header 26 may generally be arranged to spray downward.

As stated earlier, the reduction in cross-sectional area of tower 20 can be made step-wise (FIG. 2) or the flue gas velocity can be continuously increased (FIGS. 3 and 4). This progressive change in the size of tower 20 will aid in directing flue gas 15 toward exit conduit 14 and will result in better flue gas distribution to mist eliminators 32. Additionally, such a tower configuration will require less material and also less stiffening and/or bracing due to either the reduced cross-sectional area or the conical shape of tower 20. The conical design (FIGS. 3 and 4) provides for a long smooth continuous transition of the flue gas velocity from its entrance into tower 20 to its exit from tower 20. This will reduce the shock loss normally associated with the sudden compression of flue gas 15 just before leaving tower 20. Furthermore, for a tray tower, the transition under tray 18 can be used to enhance or define the incoming angle of flue gas 15 which will also contribute to a reduction in tower height. Also, the conical design of FIGS. 3 and 4 result in less spray impingement on the walls due to the constantly varying cross-section of tower 20 thus further reducing the detrimental wall effect on $SO_2$ removal. Also, the height of spray zone 30 can be reduced by arranging nozzles 28 of the lowermost header 26 to spray upward while nozzles 28 of the uppermost header 26 can be arranged to spray downward or vice versa. This will have the effect of not only reducing the pressure drop within tower 20, but it will also reduce the spray impingement on underneath headers.

FIGS. 2-4 illustrate a generally cylindrical tower 10 having an outer circumference and a varying diameter. However, other configurations of tower 10 are also likely, such as square, rectangular, or other non-circular shapes. Also, the velocity ranges specified herein are merely design velocities for the various zones. It is known that these velocities will vary depending upon the system load. For example, at 50% load, a 12 FPS design zone will operate instead at 6 FPS.

What is claimed is:

1. A method of configuring an elongated absorber tower having a tray zone surrounding a gas distribution device positioned across the tower, a spray zone, and a mist eliminator zone, located in that order along the length of the tower and through which a flue gas passes upwardly therethrough, wherein the improvement comprises the step of constructing and arranging the tower wherein the cross-sectional area of the tray zone is greater than the cross-sectional area of the spray zone and wherein the said cross-sectional area of the spray zone is greater than the cross-sectional area of the mist eliminator zone thereby defining a first flue gas velocity through the tray zone, a second greater flue gas velocity through the spray zone and a third flue gas velocity through the mist eliminator zone which is greater than said second flue gas velocity.

2. The method as set forth in claim 1 further comprising the step of constructing and arranging the tower in a truncated conical shape.

3. The method as set forth in claim 2 further comprising the step of passing the flue gas through the tray zone at a velocity of about 4-10 feet per second, more or less.

4. The method as set forth in claim 3 further comprising the step of passing the flue gas through the spray zone at a velocity of about 7-12 feet per second, more or less.

5. The method as set forth in claim 4 further comprising the step of passing the flue gas through the mist eliminator zone at a velocity of about 11-20 feet per second, more or less.

6. The method as set forth in claim 5 further comprising the step of installing at least one upwardly directed spray header above said tray zone.

7. An absorber tower configured as an elongated housing enclosing a tray zone surrounding a gas distribution device extending across the tower, a flue gas spray zone and a mist eliminator zone, located in that order along the length of the housing and through which a flue gas passes upwardly therethrough, wherein the improvement comprises first reduction means for reducing the cross-sectional area of the spray zone to a value less than the cross-sectional area of the tray zone and second reduction means for configuring the cross-sectional area of the mist eliminator zone less than the cross-sectional area of the spray zone thereby progressively increasing the flue gas velocity through the tower.

8. The apparatus as set forth in claim 7 wherein the tower is configured as a truncated cone.

9. The apparatus as set forth in claim 8 wherein the flue gas passes through the tray zone at a velocity of about 4-10 feet per second, more or less.

10. The apparatus as set forth in claim 9 wherein the flue gas passes through the spray zone at a velocity of about 7-12 feet per second, more or less.

11. The apparatus as set forth in claim 10 wherein the flue gas passes through the mist eliminator zone at a velocity of about 11-20 feet per second, more or less.

12. The apparatus as set forth in claim 11 further comprising at least one upwardly directed spray header located above said tray zone.

* * * * *